(12) United States Patent
Krämer et al.

(10) Patent No.: US 6,938,513 B2
(45) Date of Patent: Sep. 6, 2005

(54) LOCKING DEVICE

(75) Inventors: Klaus Krämer, Baudenbach (DE); Susanne Pintus, Herzogenaurach (DE)

(73) Assignee: INA-Schaeffler KG, Herzogenaurach (DE)

( * ) Notice: Subject to any disclaimer, the term of this patent is extended or adjusted under 35 U.S.C. 154(b) by 256 days.

(21) Appl. No.: 10/352,528

(22) Filed: Jan. 28, 2003

(65) Prior Publication Data

US 2003/0140722 A1 Jul. 31, 2003

Related U.S. Application Data

(60) Provisional application No. 60/353,544, filed on Jan. 31, 2002.

(51) Int. Cl.$^7$ ............................................. B60K 20/00
(52) U.S. Cl. ................. 74/473.21; 74/473.25; 74/473.36
(58) Field of Search ................... 74/473.21, 473.24, 74/473.25, 473.33, 473.36

(56) References Cited

U.S. PATENT DOCUMENTS

| | | | | |
|---|---|---|---|---|
| 1,909,644 A | * | 5/1933 | Westcott | 192/53.3 |
| 4,129,046 A | * | 12/1978 | Lemcke, Jr. | 74/473.33 |
| 4,494,419 A | * | 1/1985 | Inui et al. | 74/473.1 |
| 4,510,819 A | * | 4/1985 | Inui | 74/473.22 |
| 4,605,109 A | * | 8/1986 | Fukuchi et al. | 192/219 |
| 4,892,001 A | * | 1/1990 | Meyers et al. | 74/473.25 |
| 5,036,721 A | | 8/1991 | Gugin | |
| 5,050,449 A | | 9/1991 | Falcou et al. | |
| 5,492,209 A | * | 2/1996 | Certeza | 74/339 |
| 6,026,702 A | | 2/2000 | Dreier et al. | |
| 6,230,579 B1 | | 5/2001 | Reasoner et al. | |
| 6,308,814 B1 | | 10/2001 | Ikegami | |
| 6,325,196 B1 | | 12/2001 | Beattie et al. | |
| 6,666,104 B2 | * | 12/2003 | Burger | 74/473.36 |

FOREIGN PATENT DOCUMENTS

| | | | |
|---|---|---|---|
| DE | 31 25 632 C1 | 12/1982 | |
| DE | 31 36 923 C1 | 1/1983 | |
| DE | 41 10 012 C1 | 5/1992 | |
| DE | 690 04 303 T2 | 2/1994 | |
| DE | 43 09 861 C1 | 10/1994 | |
| DE | 195 44 837 A1 | 6/1996 | |
| DE | 197 23 507 A1 | 1/1999 | |
| DE | 199 01 056 A1 | 8/1999 | |
| DE | 199 18 509 A1 | 12/2000 | |
| DE | 19946817 C1 * | 1/2001 | F16H/59/04 |
| DE | 100 51 381 A1 | 5/2001 | |
| DE | 100 15 079 A1 | 10/2001 | |
| JP | 2001-125318 | 5/2001 | |
| JP | 2001-206094 | 7/2001 | |

* cited by examiner

*Primary Examiner*—David M. Fenstermacher
(74) *Attorney, Agent, or Firm*—Volpe and Koenig, P.C.

(57) ABSTRACT

A locking device is provided with a locking finger (12), the locking finger (12) being provided with a clearance space (12a).

9 Claims, 11 Drawing Sheets

LOCKING DEVICE

CROSS-REFERENCE TO RELATED APPLICATIONS

This application claims the benefit of U.S. Provisional Application Ser. No. 60/353,544, filed Jan. 31, 2002, which is incorporated by reference herein as if fully set forth.

FIELD OF THE INVENTION

The invention relates to a locking device with a locking member for selectively locking at least one first selector shaft actuated by a shift finger and also a second selector shaft, wherein the shift finger is pivotable around a tilt axis to be alternatively movable to positively engage in one of the selector shafts, and wherein the selector shaft in which the shift finger engages is longitudinally displaceable in at least one direction, and wherein the first selector shaft is longitudinally fixed by means of the locking member with respect to the second selector shaft when the shift finger pivoted around the tilt axis is moved to positively engage in the second selector shaft.

BACKGROUND OF THE INVENTION

Such a locking device is described in DE 31 25 632 C1. Longitudinally displaceable selector shafts are allocated to a shift finger. Individual gears of the gearbox can be shifted with the selector shafts. The selector shafts are provided with engagement grooves forming shift planes, in which the shift finger can engage by corresponding axial displacement of a shift shaft. When the engagement grooves lie in a line aligned in the displacement direction of the shift finger, the shift shaft of the gearbox is located in a neutral position in which no gear is engaged. Upon selecting a shift plane, the shift finger engages in one of the engagement grooves of one of the selector shafts. By rotation of the shift shaft with the shift finger, the shift finger pivots and shifts one of the gears. Two radially projecting locking cams are provided on the shift finger. The locking cams are situated in the neutral position, aligned generally horizontally above the engagement grooves and cooperate with fork-like wall portions of the engagement grooves extended as far as the plane of the locking cams. The external periphery of the locking cams is provided with circular symmetry. The fork-like wall portions are matched to the circular arcuate shape of the locking cam and enclose the locking cam with a little play. The locking cams fix the selector shafts in the neutral position. The width of the locking cams is designed so that, taking account of the whole displacement path of the shift finger, each of the selector shafts allocated to the shift finger is fixed. A respective slot is milled in the locking cams. The slots are situated in a common pivoting plane with the shift finger. The width of the slots is slightly larger than the thickness of each individual selector shaft. The slots are situated in a common pivoting plane with the shift finger. After the selection of the shift plane, the shift finger, the slot and the wall portions of a selector shaft lie in a common plane. The selector shaft can be shifted by means of the pivoting shift finger, since the wall portions alternatively dip into the slots of the locking cam in dependence on the displacement direction of the selector shaft. The depth of the slots is designed so that they form end stops for the longitudinal movements of the selector shaft.

The locking device is used in shift devices for shifting gears by means of a shift lever. A respective shift plane is respectively allocated to one or two selectively shiftable gears situated on a gearshaft. Several gears can be shifted by the shift device. A shift plane is allocated to at least one gear, or at most two gears. Each gear can be shifted only in its predetermined shift plane.

The shift lever is arranged pivotably with respect to a housing by means of a support arrangement. The support arrangement makes possible pivoting movements of the shift lever in a selection plane and in a shift plane aligned transversely of the selection plane. The shift lever is guided by a slide during the selection and shifting processes.

The shift lever is located in the selection plane in a neutral position and is pivotable in the selection plane out of the neutral position by the selection of shift planes alternatively into one of at least two inoperative positions. If the shift lever is located in one of the inoperative positions, a shift plane is selected. The shift lever is pivotable out of the inoperative position in the shift plane for shifting one of the gears. The neutral position of the shift lever is for the most part also one of the inoperative positions, from which one of two gears is selectively shiftable.

In the inoperative positions or in the neutral position of the shift lever, selector shafts are located in a middle, neutral position, in which the gears shiftable by means of the selector shafts are not shifted. The shift lever is provided with a shift finger at a free end. Each of the selector shafts has an engagement groove or a shift opening for the engagement of the shift finger. A selective engagement in one of at least two axially parallel selector shafts is performed by selection movements of the shift lever. The shift lever is movably coupled to one of the selector shafts in these positions.

Pivoting of the shift lever in the shift plane out of the inoperative position in one or other direction results in a displacement of the selector shaft coupled to the shift lever, since the shift finger acts on a side bounding the engagement groove. One of the gears allocated to the selector shaft is engaged by the displacement of the selector shaft.

The shift lever is as a rule pivotably received by means of a universal joint in a housing fixed to a vehicle. This joint or this support arrangement provides for a casing of box-like constitution. The casing receives the shift lever and is mounted for pivoting, by means of the shift lever, on the housing fixed to the vehicle, around a tilt axis aligned transversely of the pivot axis. The tilt axis is aligned with the mid-axis of one or two pivot studs, as desired. The pivot studs support the casing in the selection plane pivotably on the housing, however not in the shifting plane. The shift lever is pivotable with the casing (and held fixed in the casing) around the tilt axis in the selection plane. Upon a selection movement at the shift finger, the shift lever pivoting around the tilt axis takes the casing with it. The shift finger is arranged on the shift lever on the side of the tilt axis opposite to the shift force application position (shift knob), and pivots with the shift lever in the selection plane around the tilt axis.

The support arrangement furthermore provides for a support of the shift lever in the casing, pivotably around a pivot axis in the shift plane. The pivot axis runs transversely of the tilt axis. The pivot axis is simultaneously the mid-axis of a pivot stud arranged in the casing. The shift lever is supported on the casing for pivoting around the pivot, however not in the selection plane. The shift finger is arranged at the opposite end of the shift lever to the pivot axis and also supported in the casing pivotably around the pivot axis in the shift plane, however not in the selection plane. The pivot axis and the tilt axis are situated intersecting in a common plane.

With the shift axis and pivot axis of the shift lever situated in one plane, limits are placed on the adjustment of shift forces and shift paths. By shift forces are to be understood the forces which are perceptible at the shift lever by the operator at the point of force application (shift knob) upon selection and shifting. At its point of force application, the shift lever covers defined paths during selection and shifting. Each further point on the lever between the point of force application and the pivot axis or tilt axis also covers paths defined by its distance from the axes. The path, for the most part in radian measure, is dependent on the distance of the shift knob to the axes. At the same pivot angle of the shift lever around the tilt axis or the pivot axis, each of the points covers the same path, independently of whether it is pivoted around the tilt axis or the pivot axis. The shift lever is often guided by a shift slide placed between the point of force application and the axes. The design of slides which save material and space are frequently subject to limitations because of the same path of the shift lever in the slide during selection and shift movements. The shift forces on the shift knob can be affected by the lever ratio of the shift lever. The lever ratio results from the distance from the knob to the axes and from the distance from the axes to the engagement of the shift finger in the engagement groove of the selector shaft. The length of the shift lever projecting into the passenger space is as a rule limited according to construction space. The length of the shift finger, starting from the intersecting axes, is dependent on the position of the elements of the internal shifting arrangements.

The pivoting shift lever is guided during selection of the shift planes and during shifting of the gears by guide paths, e.g., a slide. The pivoting movements of the shift lever in the selection and the shift direction are limited by stops. The stops ensure that the shift finger engages exactly in one of the engagement grooves of one of the selector shafts after the conclusion of selection. The stops limiting the shift path of the shift finger ensure that the selector shaft is displaced exactly into its predetermined position and no further.

Only one gear can be shifted during a shifting process. If two gear are allocated to a shift plane, one of the gears in the shift plane is from the outset not shiftable, or is locked in the shift plane by means of a locking device, while the other is shifted. According to the embodiment of the shift device, the further shift planes adjacent to the selected shift plane are locked against inadvertent or automatic selection. An incorrect selection or shifting is excluded. The gears in the shift planes adjacent to the selected shift plane are locked against inadvertent or automatic selection during the shifting of a gear and when a gear is engaged. The reverse gear is as a rule locked against inadvertent selection or shifting from one of the shift positions or selection positions for respective shifting or selection of the forward gears.

SUMMARY OF THE INVENTION

At the time of the invention, the object was to provide a locking device which permits simple and cost-effective assembly into a gearbox.

The invention is attained according to the characterizing portion of claim 1 in that the locking element is a locking finger. On each of the selector shafts, an open slot of the locking finger is provided in the direction of the tilt axis and also of the locking finger pivoted around the tilt axis. The locking finger selectively engages in one or more of the slots. Thereby at least a first selector shaft is longitudinally fixed by the locking finger with respect to the second selector shaft when the shift finger, pivoted around the tilt axis, engages positively movable in the second selector shaft. The second selector shaft is longitudinally fixed relative to the first selector shaft by means of the locking finger when the shift finger, pivoted around the tilt axis, positively movably engages in the first selector shaft. The locking finger pivoting around the tilt axis is pivotable into the slots situated one behind the other and mutually aligned in the pivoting direction of the locking finger, until the shift finger positively engages in one of the selected, longitudinally movable selector shafts and also the locking finger positively engages in the slot of at least one selector shaft to be fixed.

With a further embodiment of the invention, the locking device is provided on the support arrangement of the shift lever. At least two, but for the most part three or four, selector shafts are situated adjacently in the pivoting region of the shift finger. In the inoperative position and also the neutral position situated in the selection plane, the selector shafts are located in a middle, neutral position. The gears which can be shifted by means of the selector shafts, by longitudinal displacement of the selector shafts, are not shifted. Each of the selector shafts has an engagement groove or a shifting opening for the engagement of the shift finger. The shift finger engages in one of the selector shafts by selection movements of the shift lever in one of the shift planes. An articulated connection between the selector shaft and the shift lever is effected.

In the shifting movement following the selection movement, in which the shift lever pivots around the shift axis, the selector shaft which is connected to the shift lever is longitudinally displaced, and one of the gears is engaged. During the shift movement of the shift lever, the other selector shafts which are not in engagement with the shift lever are locked against longitudinal movements. The selector shafts are locked by the support arrangement after the conclusion of the selection process. At least one locking finger is provided on the casing for this purpose. This locking finger engages in a slot formed on the selector shaft and longitudinally fixes the selector shaft. Each of the selector shafts has one of the slots. The slot is open in the direction of the locking finger and also in the direction of the shift lever pivoting around the tilt axis. In the middle, neutral position of the selector shafts, the selector shafts or the slots of the selector shafts are mutually aligned such that the slots lie one behind the other in the pivoting direction of the locking finger and are mutually aligned.

The locking finger pivots during selection movements on the shift lever with the casing pivoting around the tilt axis, and can be freely moved in its pivoting direction through the mutually adjacently situated slots, until the shift finger positively engages in one of the selected longitudinally movable selector shafts and also the locking finger positively engages in the slot or slots of a selector shaft to be fixed. The selector shaft then on by the shift finger is not locked and is freely movable in the longitudinal direction by means of the shift finger. Upon pivoting movements of the shift lever around the pivoting axis for shifting gears, the locking finger remains in the slot of the locked selector shaft and keeps this in its locked position during the shift processes and during travel with a gear engaged.

An embodiment of the invention provides that at least three of the selector shafts are allocated to the shift finger. The locking finger simultaneously engages in two of the selector shafts. The shift finger is positively connected to the selector shaft to be shifted. If the shift finger is located after the conclusion of the selection process in a shift plane which is allocated to a selector shaft arranged between two selector shafts which are to be locked, the locking finger simultaneously locks the adjacent selector shafts. A clearance space on the locking finger ensures that the selected selector shaft can be pivoted by means of the shift finger, freely movable and without contact with the locking finger. The clearance space is located over the slot of the longitudinally freely movable selector shaft. The locking finger thus does not engage this selector shaft in the slot. The selector shaft movable with the shift finger passes through the clearance space on the locking finger and is thus without contact with the locking finger. In the simplest form, the locking finger is a flat sheet metal part. The sheet metal part either protrudes, integrally from the wall, out of the wall of the casing in an imaginary plane through which the tilt axis of the shift lever passes perpendicularly, or is fastened separately to this. The locking finger has sufficient width in this plane so that each of the selector shafts to be locked can be acted on by the locking finger in each pivoted position of the locking finger.

The casing is supported on a housing fixed to the vehicle, pivotably by means of the shift lever around a tilt axis aligned transversely of the pivot axis. The tilt axis is aligned with the mid-axis of alternatively one or two pivot studs. The pivot studs support the casing on the housing, pivotably in the selection plane, however not in the shift plane. The shift lever is pivotable in the selection plane, unmoving with respect to the casing, and pivotable with the casing around the tilt axis. Upon a selection movement on the shift finger, the shift lever pivots around the tilt axis takes the casing with it. The shift finger is arranged on the shift lever on a side facing away from the point of application of shift force, preferably on the opposite side, of the tilt axis, and pivots around the tilt axis with the shift lever in the selection plane.

In the device according to the invention, the engagement grooves are located in the middle, neutral position of the selector shaft, mutually aligned in a line in the selection directions. The shift finger can pivot in the selection plane, unhindered by the engagement grooves, until the inoperative position of the shift lever is reached and the shift lever engages in one of the engagement grooves.

The support arrangement of the shift lever furthermore provides for the pivotable support of the shift lever in the shift plane around a pivot axis in the casing. The pivot axis runs transversely of the tilt axis. The pivot axis is aligned with the centers of two support eyelets situated oppositely in the casing or alternatively with one support eyelet constituted in the casing. The shift lever is then mounted on the casing, pivotably around a pivot stud mounted in the support eyelet(s), but not in the selection plane. The shift knob and the shift finger respectively point away from the pivot axis in another direction. Upon shift movements, the shift lever is movably coupled by the shift finger to one of the engagement grooves of a selector shaft. The shift movement effects the displacement of the selector shaft. The shift finger then acts on a side of the engagement groove situated in the displacement direction of the selector shaft. One of the gears allocated to the selector shaft is engaged by the displacement of the selector shaft.

With one embodiment of the invention, it is provided that the tilt axis and the pivot axis of the shift lever are mutually spaced apart. The pivot axis and the tilt axis, according to the invention, are situated horizontally on different planes and vertically, according to the embodiment of the support arrangement, on a common plane or in different planes. The pivot axis and the tilt axis are then situated between the point of force application to the shift knob and the shift finger. Pivoting movements around the nearer of the axes to the shift finger result at the shift knob, and also at each of the points adjoining the shift knob in the direction of this axis, in a longer path covered in radian measure when the shift device limits both the selection movements and the shifting movements to the same pivot angle.

In one embodiment of the invention, the pivot studs are received non-rotatably in the housing. The casing is pivotable around the pivot studs. A plain bearing is arranged between the pivot stud and the casing in each of the support eyelets of the casing. Alternatively to this, the pivot stud is seated fitting without special mounting exactly into the support eyelet of the casing. The shift lever is either pivotable around the pivot stud immovably fixed to the casing, or the pivot stud is seated fixedly in the shift lever and is moved in support eyelets of the casing. Alternatively, the supports of the shift lever on the pivot stud, or the supports of the pivot stud in the casing, are provided with plain bearings.

BRIEF DESCRIPTION OF THE DRAWINGS

The invention is explained in detail hereinbelow on the basis of exemplary embodiments.

FIGS. 1–9 show an exemplary embodiment of a support arrangement according to the invention in different views and sectional diagrams. In detail, FIG. 1 shows an overall view of the support arrangement, FIG. 2 shows a longitudinal section through the support arrangement, FIG. 2a shows the shift schematic of the positions of the shift lever, FIG. 3 shows a cross section of the support arrangement, FIG. 4 shows a schematic diagram of the position of the tilt axis and the pivot axis with respect to the shift lever, FIG. 5 shows a longitudinal section through the support arrangement with the shift lever pivoted around the tilt axis in a selection direction, FIG. 6 shows a cross section through the device with the shift lever pivoted around the pivot axis in a shift position, FIG. 7 shows an overall view of the support arrangement without the housing, FIG. 9 shows a side view of the support arrangement with the locking finger.

DETAILED DESCRIPTION OF THE PREFERRED EMBODIMENTS

Figure 1:
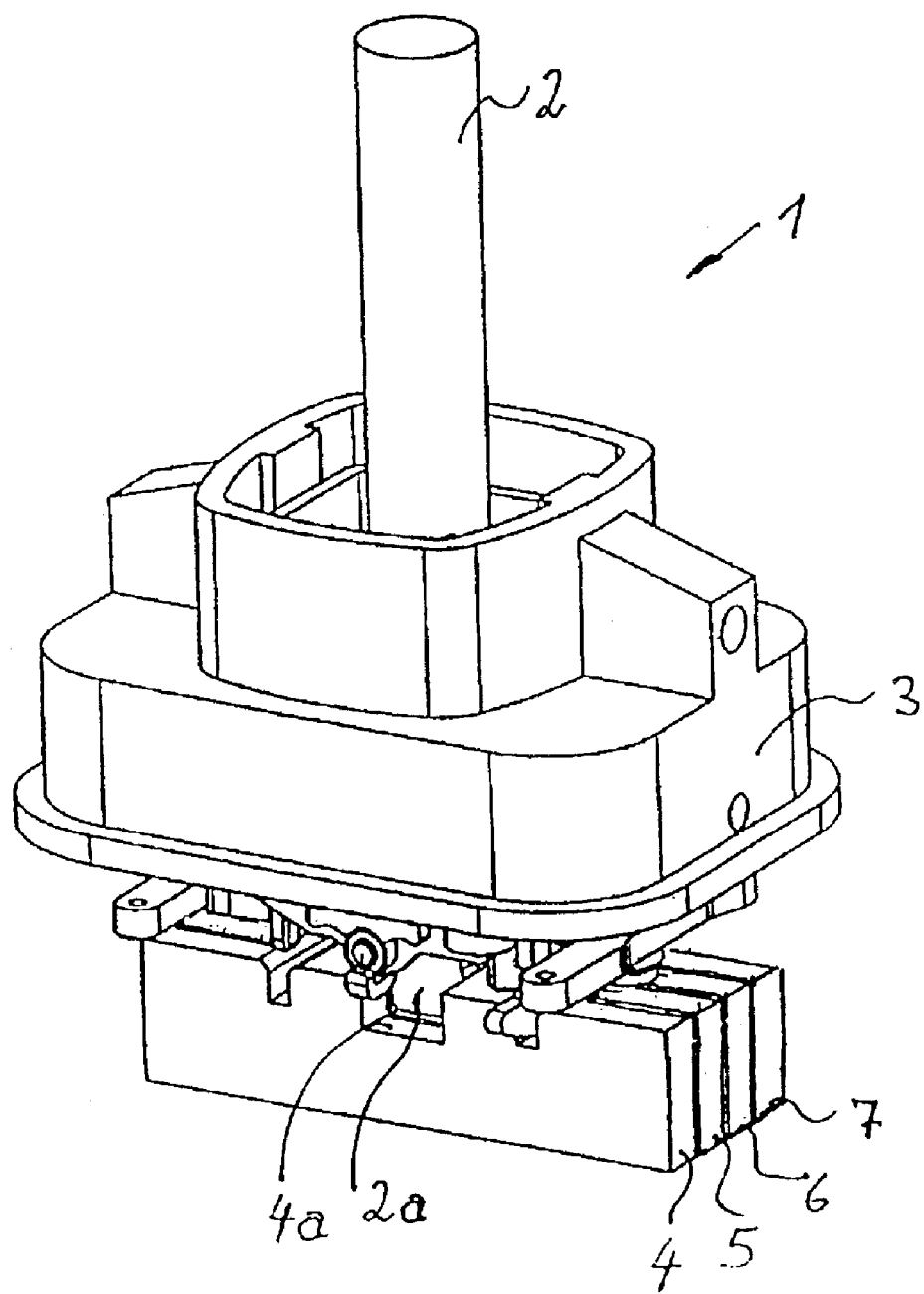

FIG. 1 shows an overall view of an exemplary embodiment of a support arrangement 1. A shift lever 2 is supported in the support arrangement 1. The support arrangement 1 is received in a housing 3. The shift lever 2 acts selectively with a shift finger 2a on selector shafts 4, 5, 6 and 7. The selector shafts 4, 5, 6 and 7 are respectively provided with an engagement groove 4a, 5a, 6a, 7a, in which the shift lever 2 engages in dependence on its selection position.

Figures 2, 2A:
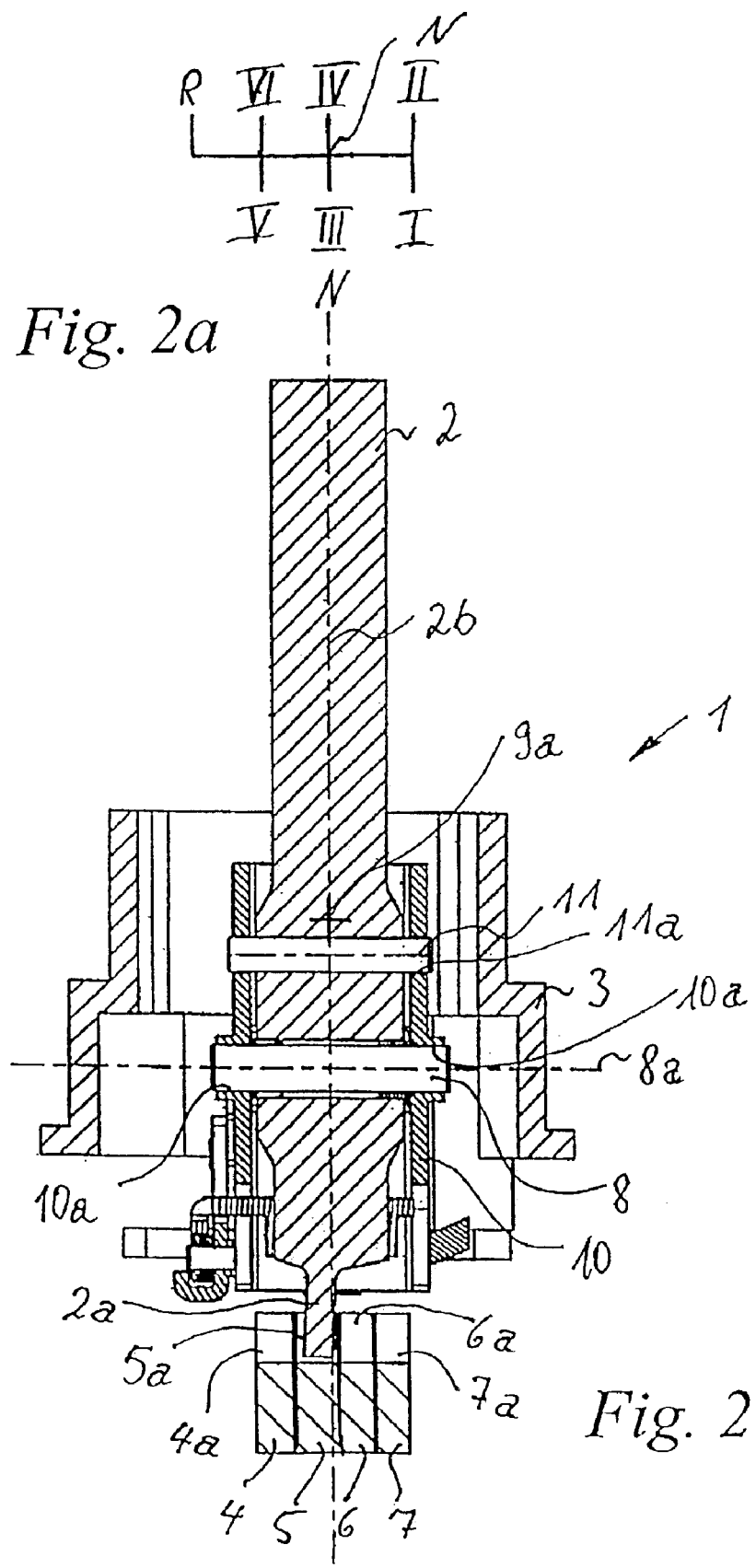

The support arrangement 1 is shown in section in FIG. 2. The shift lever 2 is in the neutral position N. The shift finger 2a runs at a slight angle to the mid-axis 2b, which is in the neutral position of the shift lever (not "finger") 2, and engages in the engagement groove 5a of the selector shaft 5. The selector shafts 4, 5, 6 and 7 are in a neutral middle position. In this neutral middle position, the engagement grooves 4a, 5a, 6a and 7a are aligned one behind the other in the pivoting direction of the shift lever 2 and also aligned with one another. The shift lever 2 is arranged in the support arrangement 1 to be pivotable out of the neutral position N around the tilt axis 9a running perpendicularly of the drawing. The shift finger 2a is pivotable around the tilt axis 9a with free movement within the engagement grooves 4a, 5a, 6a, and 7a when the shift lever 2 is pivoted. The shift lever 2 is mounted in a casing 10 for pivoting around the pivot axis 8a on a pivot bolt 8. The pivot bolt 8 is seated fixed in support eyelets 10a of the casing 10. Furthermore, a stop 11 in the form of a pin is fastened in the shift lever 2. The pivoting angle of the shift lever 2 around the pivot axis 8a in a slotted hole 11a extending in the pivoting direction is limited by the stop 11 (see also FIG. 7).

The shift lever 2 with the shift finger 2a is pivotable around the pivot axis 8a from the neutral position N. The shift finger 2a then acts on a side of the engagement groove 5a situated in the pivoting direction. A shift plane from which the third and fourth gears can be shifted is allocated to the selector shaft 5. FIG. 2a shows the shift diagram for the selection or shift positions of the shift knob 2c. The shift lever 2 is pivotable around the tilt axis 9a out of the shift plane III–IV toward the shift plane I–II. In the shift plane I–II, the shift finger 2a engages in the selector shaft 4. The first or second gear can be shifted with the selector shaft 4 by means of the shift lever 2 pivoting around the shift axis 8a. The shift finger 2a pivoted around the tilt axis 9a in the shift plane VI–V engages in the selector shaft 6. The fourth or fifth gear can be selectively switched by pivoting the shift lever 2 around the pivot axis 8a. The shift plane of the reverse gear R is selected by a pivoting movement of the shift lever 2 around the tilt axis 9a out over the shift plane VI–V. The shift finger 2a then engages in the engagement groove 7a of the selector shaft 7. The reverse gear can be shifted into from this position by pivoting the shift lever 2 around the pivot axis 8a.

Figure 5:
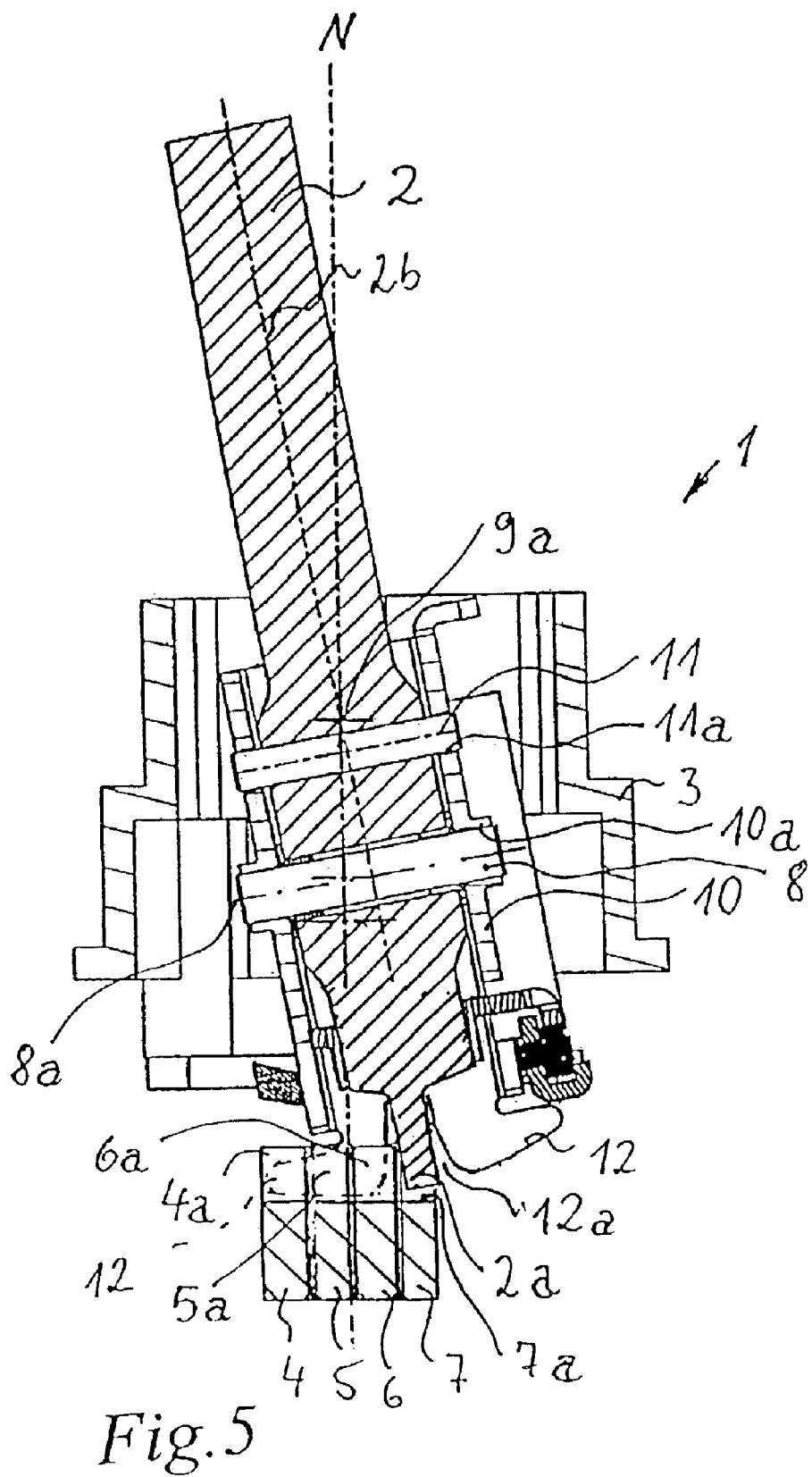

FIG. 5 shows the same section as in FIG. 2. The shift lever 2 is however moved into the shift plane of the reverse gear R by pivoting around the tilt axis 9a. The shift finger 2a engages for this purpose in the engagement groove 7a of the selector shaft 7. From this position, the shift lever 2 is pivotable around the pivot axis 8a. The shift finger 2a pivoting with the shift lever 2 then drives the selector shaft 7 in its longitudinal direction until the reverse gear R is engaged.

Figure 3:
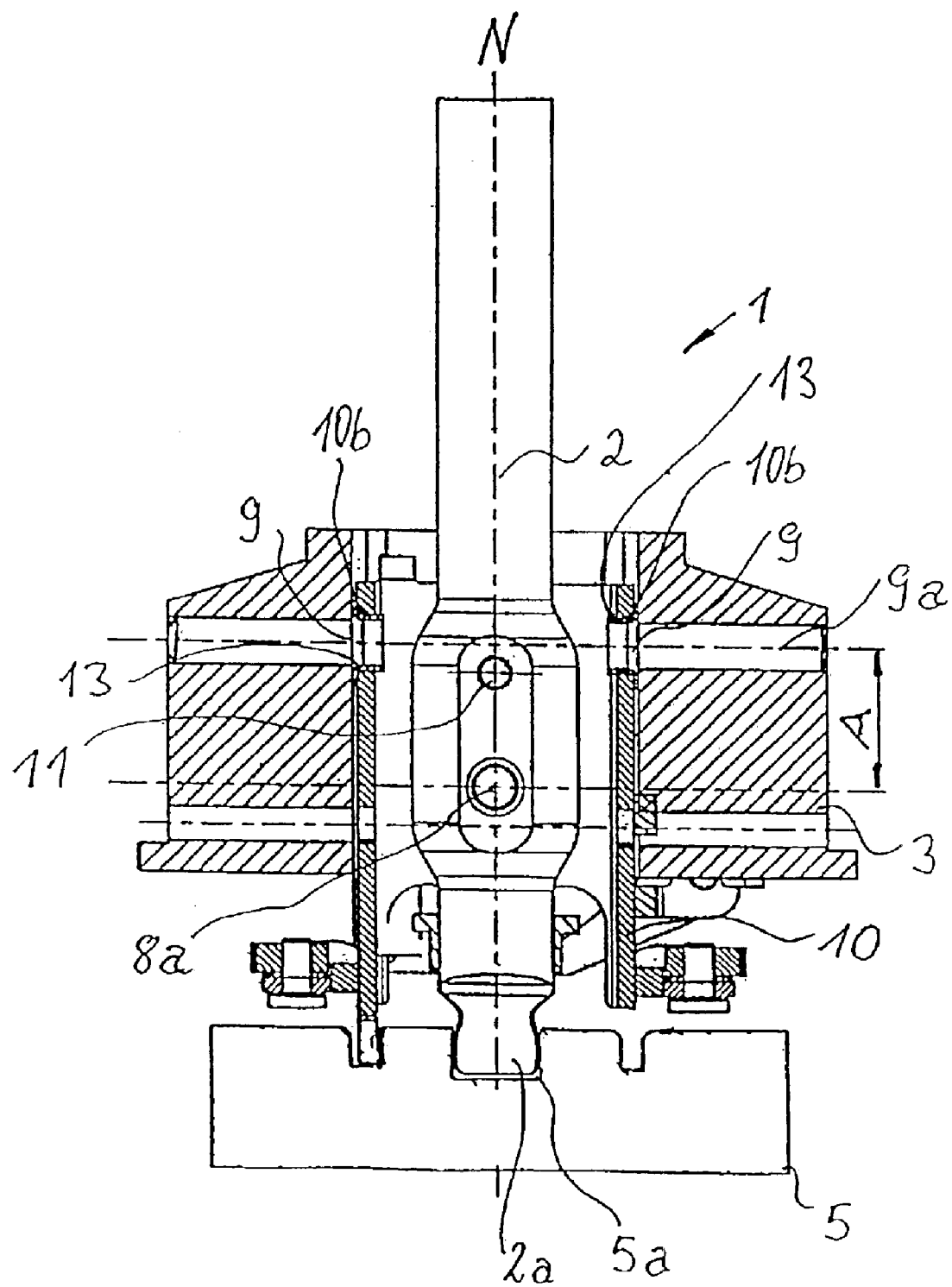

FIG. 3 shows a cross section of the mounting arrangement 1. The shift lever 2 is located in the neutral position and engages with its shift finger 2a in the selector shaft 5. In this view, the selector shaft 4 is hidden by the selector shaft 5. The shift finger is positively coupled to the selector shaft 5 by the engagement in the engagement groove 5a. The shift lever 2 is pivotable out of the neutral position around the tilt axis 9a and the pivot axis 8a. The tilt axis 9a is the midline of two pivot studs 9. The pivot studs 9 are arranged fixed in the housing 3 and respectively engage in a support eyelet 10b in the casing 10. The casing 10 is supported on the pivot studs 9 by the shift lever 2 by means of plain bearings 13 in the support eyelet 10b. The pivot axis 8a and the tilt axis 9a run spaced apart from each other by the distance A and also transversely of one another. The pivot axis 8a is situated nearest to the shift finger 2a.

Figure 4:
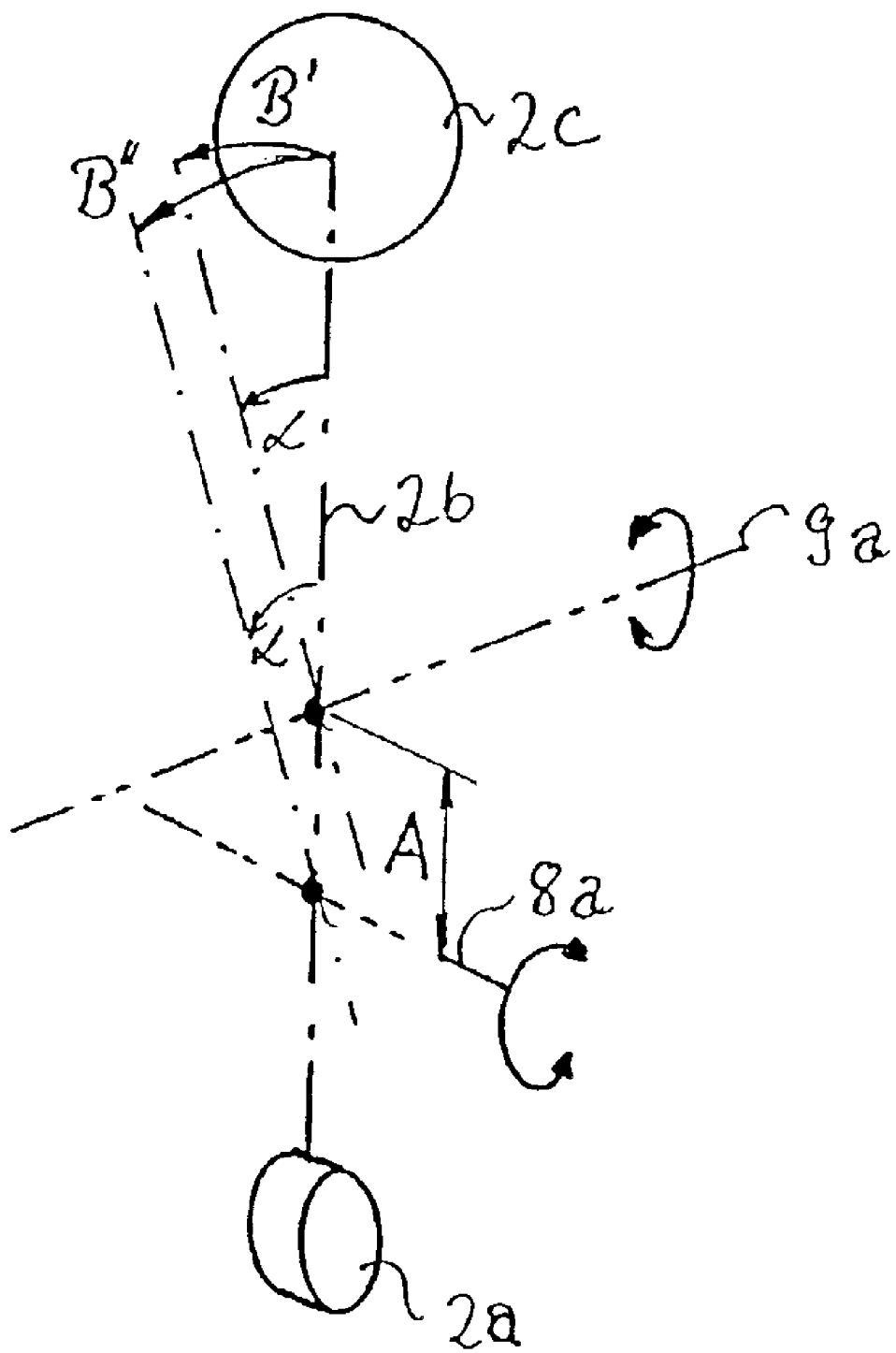

FIG. 4, a schematic diagram of the shift lever 2 with the axes 8a, 9a, shows that different selection and shift paths at the shift knob 2c of the shift lever can be attained by the axes 8a, 9a mutually spaced apart by the distance A. The shift knob 2c travels the path B' in radian measure when the shift lever 2 is pivoted by the angle α around the tilt axis 9a. When the shift lever 2 is pivoted by the same angle α around the pivot axis 8a, the shift knob 2c travels the path B" in radian measure. Because of the distance A between the axis 8a and the axis 9a, B" is greater than B'.

Figure 6:
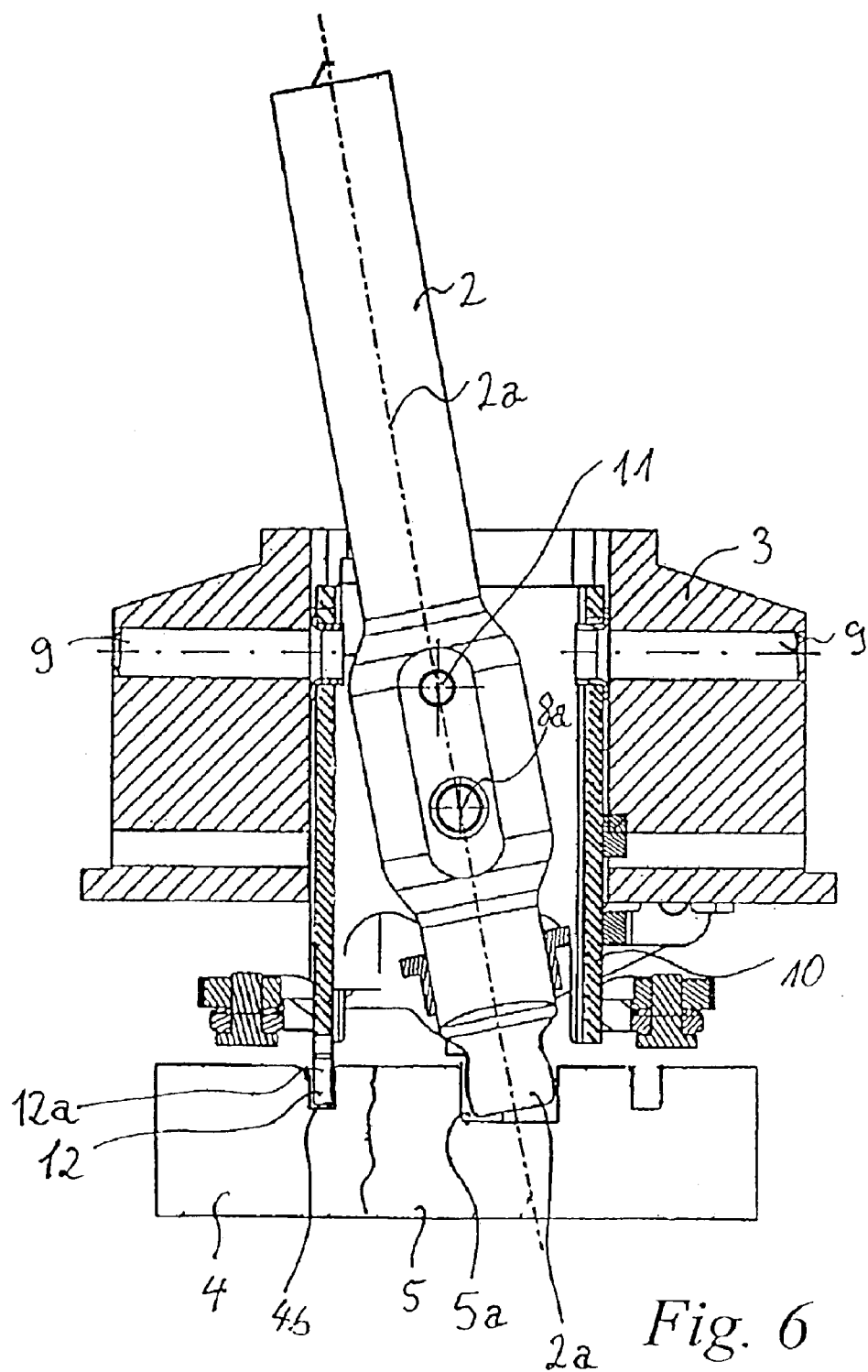
Figure 9:
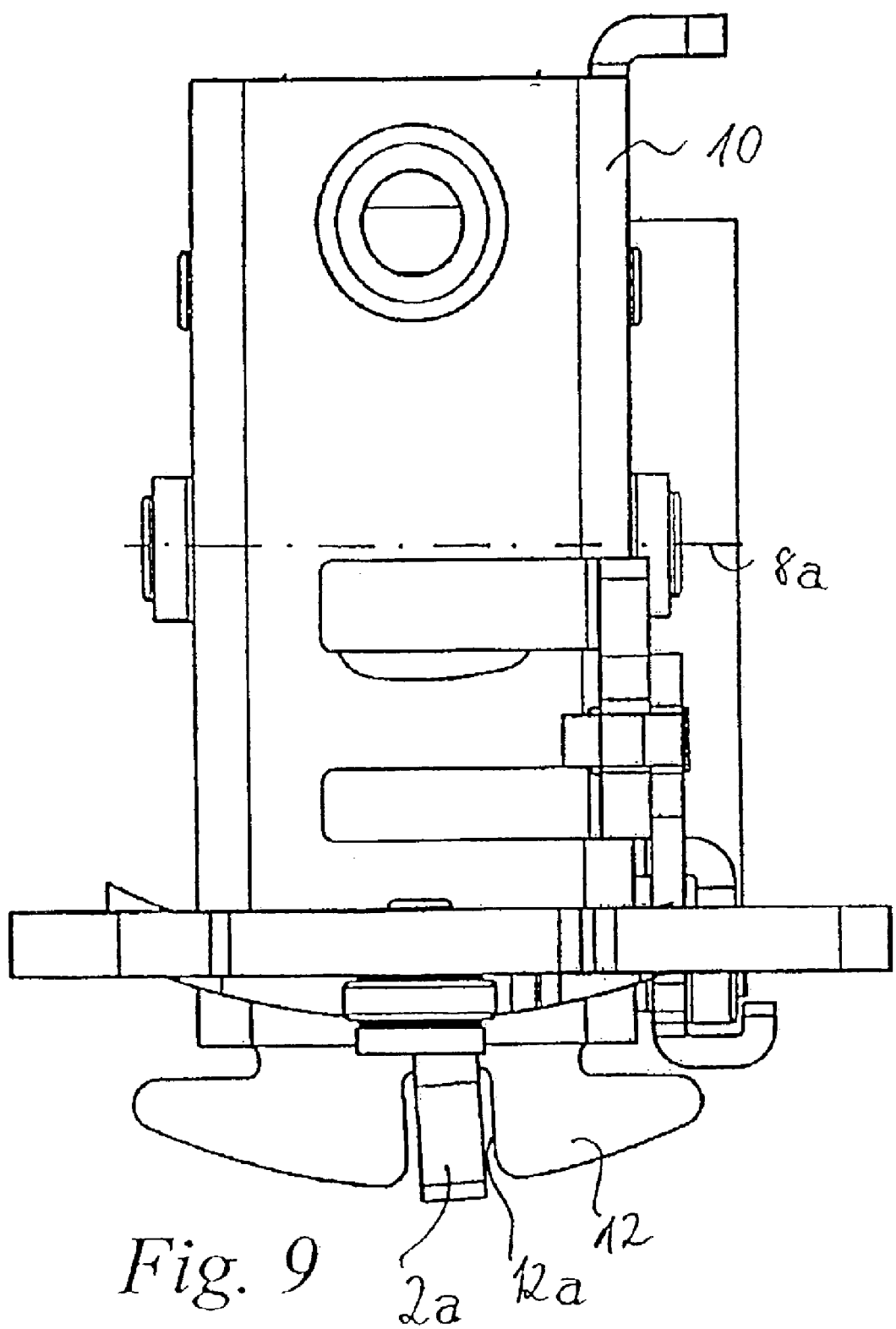

FIG. 6 shows the support arrangement 1 in the same sectional illustration as in FIG. 3. The shift lever 2a is pivoted around the pivot axis 8a into a shift position and thus has displaced the selector shaft 5 in its longitudinal direction by means of the shift finger 2a. The selector shaft 4 remains unchanged in its position. In this position, the selector shaft 4 is fixed to the casing 10 by means of a locking finger 12. The locking finger 12 engages in a slot 4b on the selector shaft 4 for this purpose. In FIG. 5, the locking finger 12 is at least partially shown in a front view. The locking finger is divided by means of a clearance space 12a. By means of the clearance space 12a, the selector shaft 5 is displaceable in the arrangement illustrated according to FIG. 6 without contact with the locking finger 12. As can be seen from the view in FIG. 5, the locking finger pivots with the shift finger around the tilt axis 9a when one of the shift planes is selected with the shift lever 2. In FIG. 5, the locking finger 12, by means of the clearance space 12a, releases the selector shaft 7 for shifting to the reverse gear, and in FIG. 6 the selector shaft 5 for shifting one of the gears allocated to the selector shaft 5. FIG. 9 shows the casing 10 with the locking finger 12, without the selector shafts. The shift finger 2a is pivotable around the pivot axis 8a in the direction of the clearance 12a, so that each of the selector shafts in engagement with the shift finger 2a is displaceable without contact with the locking finger 12, due to the clearance space 12a.

Figure 7:
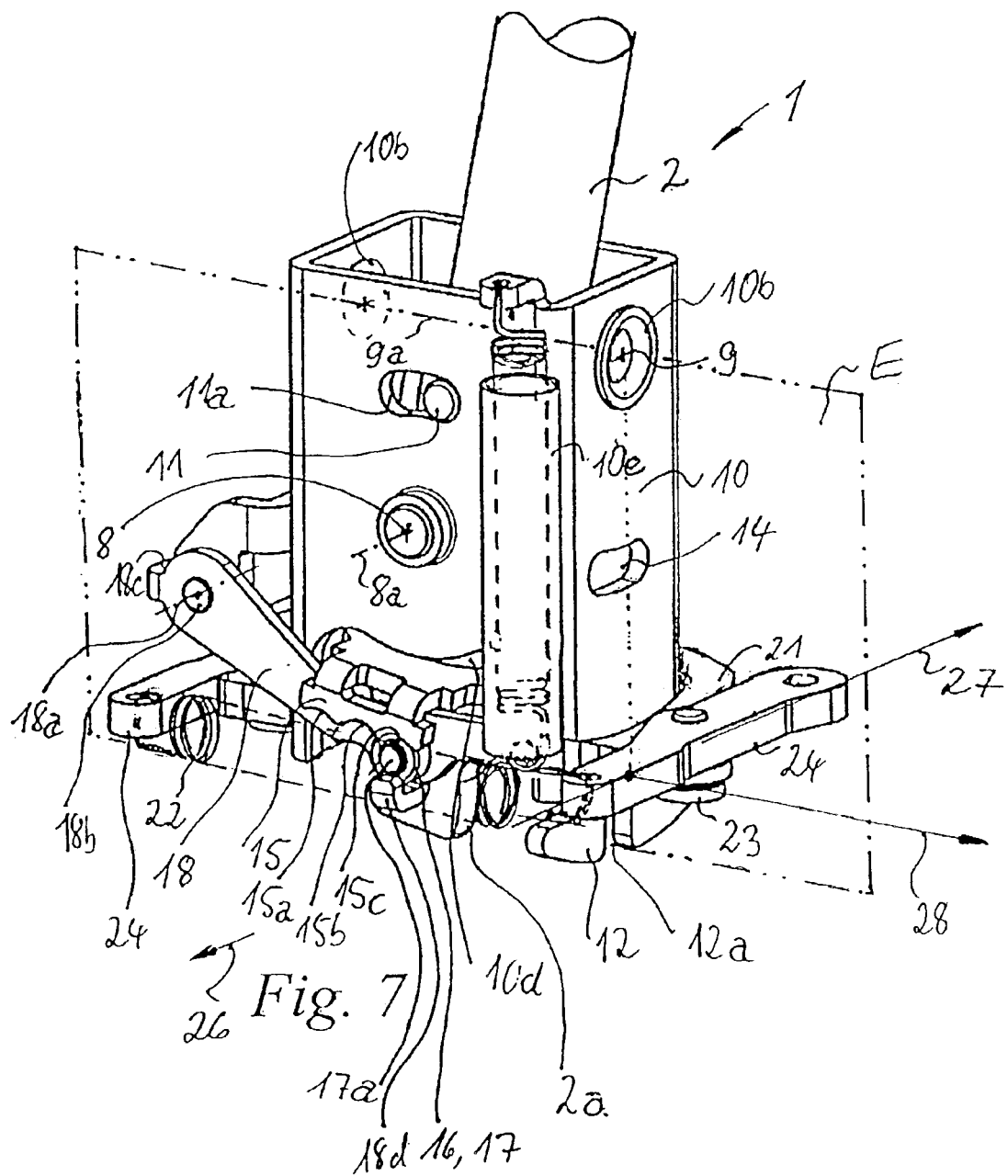

FIG. 7 shows the support arrangement 1 without the housing 3. The casing 10 is manufactured from a profile or is bent into a profile from sheet metal. Slotted holes 11a and 14 are formed in the casing. The stop 11 engages in the slotted hole 11a, as already initially described. The stop 11 extends from the shift lever 2. The pivot angle of the shift lever 2 around the pivot stud 8 in the casing 10 is limited by the stop 11 in the slotted hole 11a. The stop 11 abuts on a respective end of the slotted hole 11a when a gear is shifted. A stop (not shown) extending from the housing 3 engages in the slotted hoe 14. The pivoting movement of the casing 10 around the pivot stud 9 is limited by means of the stop in the slotted hole 14.

The support arrangement 1 has a latch contour 15 with latch depressions 15a, 15b and 15c. The latch contour 15 is formed from sheet metal. The metal sheet is bent angularly and fastened to the shift lever 2 by means of a prolongation 15d extending from the latch contour 15. The prolongation 15d here passes through a wall 10c of the casing 10 through which the pivot axis 8a of the shift lever 2 passes, at an opening 10d of the wall. A latch element 16 is prestressed against the latch contour 15. The latch element 16 is a roller 17. The roller 17 is rotatably seated on a bolt 17a. The bolt 17a is fastened to a pivot lever 18. The pivot lever 18 is fastened to a bolt 18b for pivoting around the pivot point 18a. The bolt 18b is fastened to a projection 19 aligned with the tilt axis 9a and pointing away from the rotation axis of the roller 17. The pivot lever 18 is formed from sheet metal and has a hook-shaped end 18c. The hook-shaped end 18c engages behind a projection 19 on a side remote from the pivot lever 18. The pivot lever 18 is thereby secured to the bolt 18b axially at the projection 19. The roller 17 which, rotatable around its rotation axis, is mounted on the pivot lever 18 is secured by means of a further hook-shaped end 18d to the pivot lever 18. The hook-shaped end 18d then engages behind the roller 17 at a side remote from the pivot lever 18.

The pivot lever 18 is loaded at an end remote from the tilt point 18a by a spring 20. The spring 20 is a tension spring and has one end inset into the pivot lever 18 and the other end inset into the casing 10. The spring 20 pulls the pivot lever 18 with the roller 17 against the latch contour 15 and is guided in a bushing 10e on the casing 10. The shift lever 2 is located in a shifted position in FIG. 7, pivoted around the pivot axis 8a. The stop 11 abuts one end of the slotted hole 11a. In this position, the roller 17 is latched in the latch depression 15c and arrests the shift lever 2 in its position. If the shift lever 2 is pivoted around the pivot axis 8a in the opposite sense to its existing pivoting position, the roller 17 rises out of the latch depression 15c and next latches in the latch depression 15b. In this position, the shift lever 2 is either in the neutral position or in one of the inoperative positions of the shift planes before the shifting of a gear. If the shift lever 2 is further pivoted in this direction, the roller 17 finally latches in the latch depression 15a and arrests the shift lever 2 in a further shift position.

The support arrangement 1 has a device for increasing selection forces. As can be gathered from FIGS. 8a and 8b, the device is formed from two ramps 21, a runoff roller 23 respectively prestressed against the ramp by a spring 22, and also two levers 24. The ramps 21 are provided on a stirrup-shaped metal sheet 25. The metal sheet 25 is fastened to the casing 10. The levers 24 are respectively arranged. pivotably in the direction of the casing 10 around a fixed pivot 24a fixed to a housing (not shown). Each of the runoff rollers 23 is rotatably arranged on a lever 24. The tension spring 22 is respectively hooked with one of its ends into an end of the lever 24 opposed to the pivot 24a. The levers 24 are prestressed against one another by means of the tension spring and thus against the casing 10. Thus a respective one of the rollers 23 is pulled by the lever 24 against a respective one of the ramps 21.

Figure 8A:
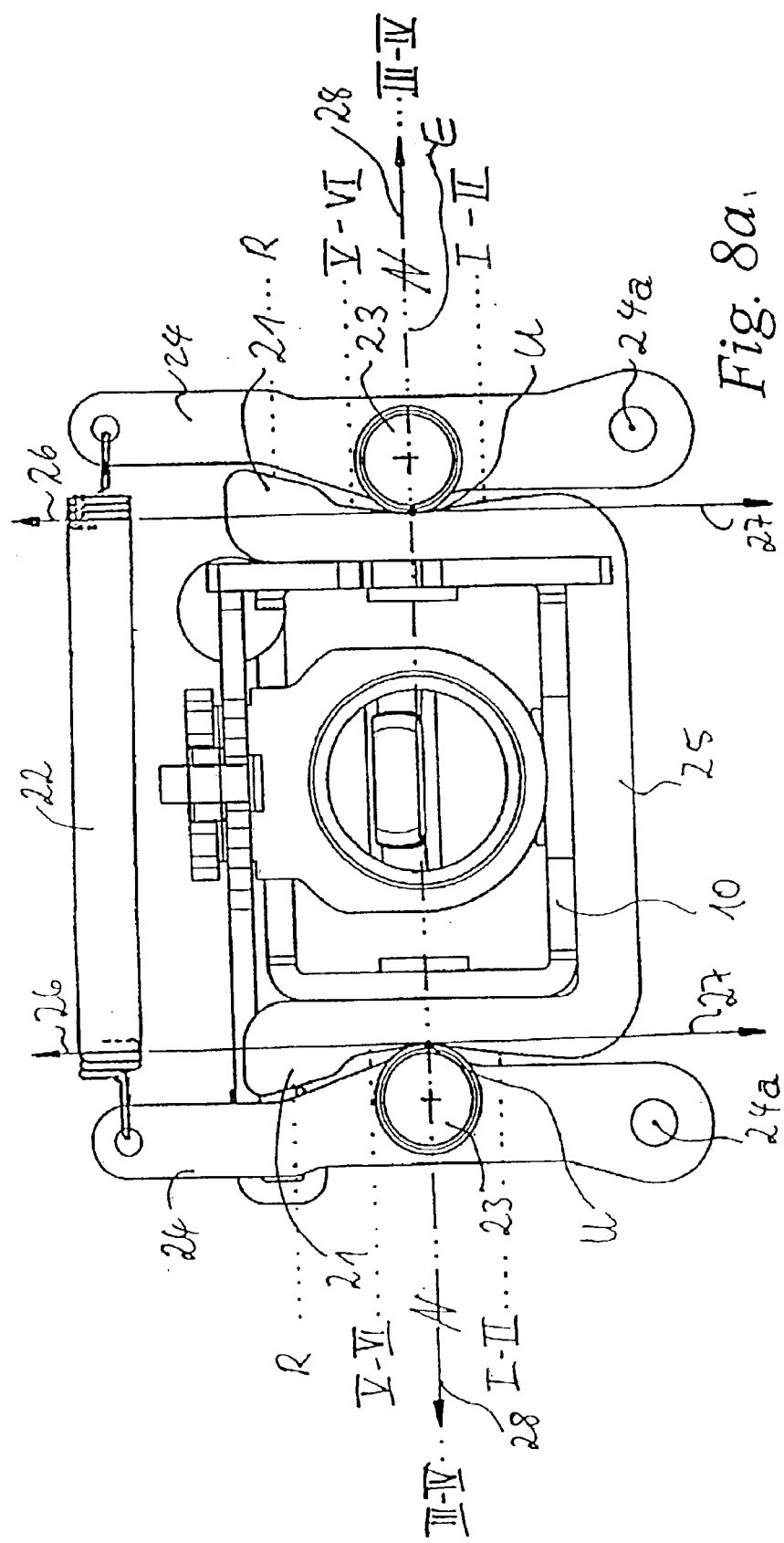
FIG. 8a shows a view of the support arrangement from below, in the neutral position of the shift lever.
Figure 8B:
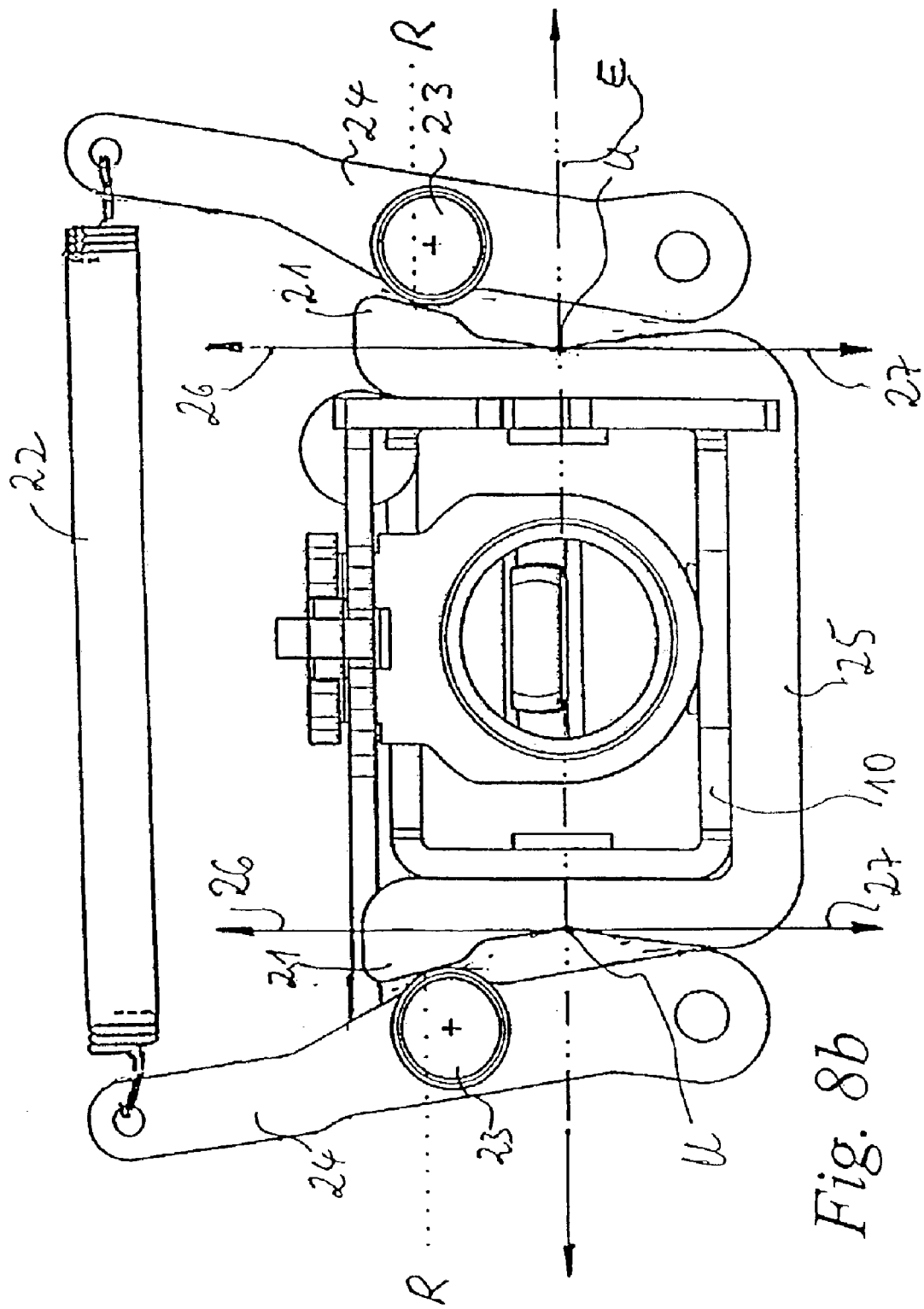
FIG. 8b shows a view of the support arrangement from below, with the shift lever pivoted into the shift plane of the reverse gear.

The ramps 21 are divided into sections of different slope, and each has the same ramp contour. The contour of each ramp 21 rises over two abscissas 26, 27 pointing in opposite directions starting from a coordinate origin U. The abscissas 26 and 27 start transversely from an imaginary plane E and are thus aligned parallel to the pivot axis 8a of the shift lever 2 (FIGS. 7, 8a, 8b). The plane E runs with the tilt axis 9a of the shift lever 2 and has the pivot axis of the shift lever 2 passing through it at right angles. The coordinate origin U is situated in the plane E. A shift lever pivoted around the tilt axis 9a pivots the casing 10 with the ramp 21 against the runoff roller 23 which is fixed in the pivoting direction. The contour of the ramps 21 is moved in the pivoting direction to the rotation axis of the runoff roller 23, whereby the respective runoff roller 23, prestressed against the ramp 21, rolls rising on the ramp 21. The ordinate 28 aligned at right angles to the abscissas 26 and 27 runs parallel to the tilt axis 9a with the plane E.

Since the ramp 21 rises away from the plane E on both sides of the coordinate origin U, a respective roller 23 on a ramp 21 in the neutral position N of the shift lever is centered at the coordinate origin U. The ramp 21 runs initially with a shallow rise over both the abscissa 26 and also over the abscissa 27. The runoff rollers 23 rising on the sections with the shallow rise produce at the shift lever 2, pivoted for selecting a shift plane with a forward gear, a relatively small selection force. Upon shifting one of the gears from the shift planes, the runoff rollers 23 respectively remain in one of the positions denoted I–II or V–VI on the respective ramp 21. In these positions, the shift lever 2 is in one of the shift planes I–II or V–VI, from which a gear can then be engaged in the respective shift plane by pivoting the shift finger 2. If the shift lever 2 is pivoted further out with the casing 10 over the position V–VI, the runoff roller 23 rising on the ramp 21 encounters a section of the ramp 21 which rises sharply away from the abscissa 26. A selection force is exerted on the casing 10 and thus on the shift lever 2 because of the steep rise, and is markedly greater than the selection force for selection of the forward gears. The shift lever 2 is about to move into the shift plane for shifting to the reverse gear R. The steep rise on the ramp 21 is finally followed by a shallower rise until in the position R. If the runoff roller 23 is in the position R, the shift plane of the reverse gear is selected. This position is shown in the drawing of FIG. 8b. The shift lever 2 can be pivoted out of the position R around the pivot axis 8a for shifting to the reverse gear R.

Figure 10:
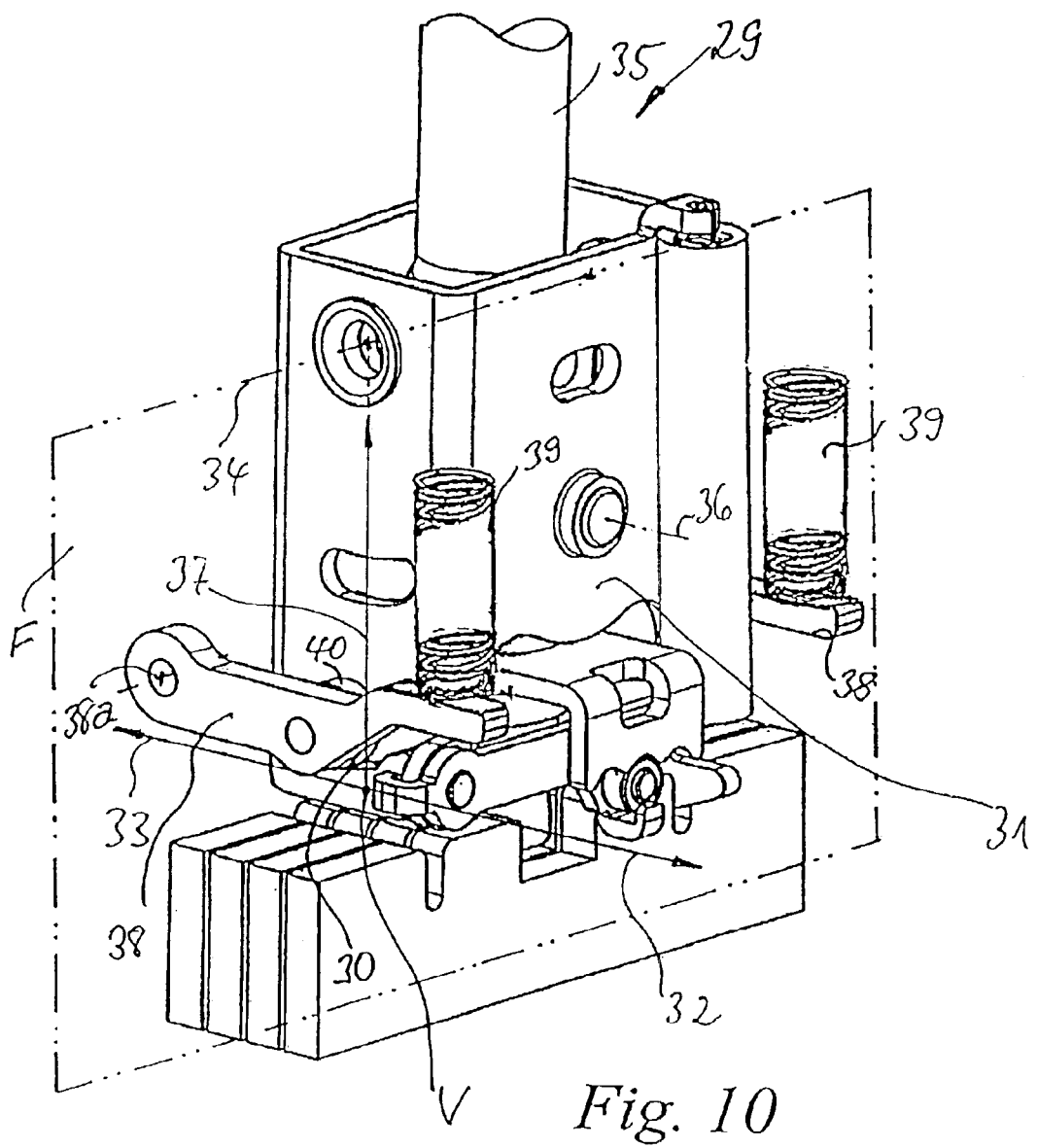
FIG. 10 shows a further embodiment example of a support arrangement according to the invention, without the housing.

FIG. 10 shows a further exemplary embodiment of a support arrangement according to the invention. The support arrangement 29 is shown without the housing. Its construction substantially corresponds to the support arrangement 1 of FIGS. 1–9. However, it differs in the construction of the arrangement of the device for increasing the selection force. The support arrangement 29 has two ramps 30, one of which is shown in the drawing, the other being hidden by a casing 31. The ramp 30 rises in the said example over two abscissas 32 and 33 pointing in opposite directions. The abscissas start at right angles from an imaginary plane F running with the tilt axis 34 of the shift lever 35 and having the pivot axis 36 of the shift lever 35 passing through it at right angles. The coordinate origin V of the coordinate system is situated in the plane F. An ordinate 37 running in the plane F starts from the coordinate origin V, at right angles to the abscissas 32 and 33. The ramp 30 rises over the abscissas 32 from the coordinate origin V and thus faces toward the tilt axis 34. A respective lever 38 mounted to the housing (not shown) for pivoting around a fulcrum 38a is prestressed by means of a compression spring 39 against a respective ramp 30. A runoff roller 40 is rotatably fastened to each of the levers 38. Each of the springs 39 is a compression spring and presses a respective one of the levers 38 to the runoff roller 40 against the ramp 30. The shift lever 35, pivoted with the casing 31 around the tilt axis 34, pivots the ramps 30 against the runoff roller 40 which is fixed to the lever 38 in the direction of movement of the ramps 30. The runoff roller 40 rises on the ramp 30, rolling on the ramp 30.

| | |
|---|---|
| 1 | support arrangement |
| 2 | shift lever |
| 2a | shift finger |
| 2b | mid-axis |
| 2c | shift knob |
| 3 | housing |
| 4 | selector shaft |
| 4a | engagement g groove |
| 4b | slot |
| 5 | selector shaft |
| 5a | engagement groove |
| 6 | selector shaft |
| 6a | engagement groove |
| 7 | selector shaft |

-continued

| | |
|---|---|
| 7a | engagement groove |
| 8 | pivot stud |
| 9 | pivot stud |
| 9a | tilt axis |
| 10 | casing |
| 10a | support eyelet |
| 10b | support eyelet |
| 10c | wall |
| 10d | opening |
| 10e | bushing |
| 11 | stop |
| 11 | slotted hole |
| 11 | stop |
| 11a | slotted hole |
| 12 | locking finger |
| 12a | clearance space |
| 13 | plain bearing |
| 14 | slotted hole |
| 15 | latch contour |
| 15a | latch depression |
| 15b | latch depression |
| 15c | latch depression |
| 16 | latch element |
| 17 | roller |
| 17a | bolt |
| 18 | pivot lever |
| 18a | tilt point |
| 18b | bolt |
| 18c | end |
| 18d | end |
| 19 | projection |
| 20 | spring |
| 21 | ramp |
| 22 | spring |
| 23 | runoff roller |
| 24 | lever |
| 24a | fulcrum |
| 25 | metal sheet |
| 26 | abscissa |
| 27 | abcscissa |
| 28 | ordinate |
| 29 | support arrangement |
| 30 | ramp |
| 31 | casing |
| 32 | abscissa |
| 33 | abscissa |
| 34 | tilt axis |
| 35 | shift lever |
| 36 | pivot axis |
| 37 | ordinate |
| 38 | lever |
| 39 | spring |
| 40 | runoff roller |

What is claimed is:

1. Locking device with a locking element for selective locking of at least a first selector shaft (4. 5, 6, 7) actuated by a shift finger (2a) and a second selector shaft (4, 5, 6, 7), wherein the shift finger (2a) pivoted around a tilt axis (9a, 34) is alternatively moveable to positively engage in one of the selector shafts (4, 5, 6, 7), and wherein the selector shaft (4, 5, 6, 7) in which the shift finger (2a) engages, is longitudinally displaceable in at least one direction by means of the shift finger (2a) pivoting around a pivot axis (8a, 36), and simultaneously the other of the selector shafts (4, 5, 6, 7) is longitudinally fixed by a locking member with respect to the selected displaceable selector shaft (4, 5, 6, 7) when the shift finger (2a) is pivoted around the tilt axis (9a, 34) wherein the locking member is a locking finger (12), the locking finger (12) alternatively positively engages in a slot (4b), open in a direction of the tilt axis (9a, 34) and also in the pivoting directions of the locking finger (12) pivoted around the tilt axis (9a, 34), on one of the selector shafts (4, 5, 6, 7), and wherein the first selector shaft (4, 5, 6, 7) is longitudinally fixed, when the shift finger (2a) pivoted around the tilt axis (9a, 34) positively engages in the second selector shaft (4, 5, 6, 7); wherein the second selector shaft (4, 5, 6, 7) is longitudinally fixed by means of the locking finger (12) when the shift finger (2a) pivoted around the tilt axis (9a, 34) positively engages in the first selector shaft (4, 5, 6, 7); wherein the locking finger (12) pivoting around the tilt axis (9a, 34) is pivotable in slots (4b) lying one behind another in a pivoting direction of the locking finger (12) and mutually aligned, until the shift finger (2a) positively engages in one of the selected longitudinally movable selector shafts (4, 5, 6, 7) and also the locking finger (12) engages in the slot (4b) of at least one selector shaft (4, 5, 6, 7) to be fixed; wherein the locking finger (12) positively extends out from a casing (10, 31) to engage in at least one of the slots (4b); and wherein the locking finger (12) is formed integrally with and extends from the casing (10, 31) which are formed from one piece of bent-up sheet metal.

2. Locking device according to claim 1, wherein at least three of the selector shafts (4, 5, 6, 7) are allocated to the shift finger (2a); wherein the locking finger (12) positively engages simultaneously in two of the selector shafts (4, 5, 6, 7) and the shift finger (2a) positively engages in one of the selector shafts (4, 5, 6, 7) movable longitudinally by means of the shift finger (2a); and wherein the locking finger (12) has a clearance space (12a) that interrupts the locking finger (12) in the pivoting direction of the locking finger (12) and located, upon fixing two selector shafts (4, 5, 6, 7) which are directly adjacent to the longitudinally freely movable selector shaft (4, 5, 6, 7), directly over the slot (4b) of the longitudinally freely movable selector shaft (4, 5, 6, 7); and wherein the selector shaft (4, 5, 6, 7) freely movable with the shift finger (2a) passes through the locking finger (12) at the clearance space (12a) without contact with the locking finger (12).

3. Locking device according to claim 2, wherein the shift finger (2a) is supported between a first wall and a second wall opposite the first wall of the casing (10, 31) with a pivot stud (8) having the pivot axis (9a, 34); wherein at least one of the walls has a support eyelet (10a) for supporting the pivot stud (8).

4. Locking device according to claim 3, wherein the tilt axis (9a, 34) and the pivot axis (8a, 36) run mutually spaced apart.

5. Locking device according to claim 4, wherein the casing (10, 31) is pivotably supported on the housing (3) by means of two mutually opposite pivot studs (9); wherein the mid-axes of the pivot studs (9) and the tilt axis (9a) coincide; and wherein the pivot studs (9a) engage in support eyelets (10b) on the casing (10, 31).

6. Locking device according to claim 5, wherein the tilt axis (9a, 34) and the pivot axis (8a, 36) run mutually spaced apart.

7. Locking device according to claim 2, wherein the casing supports, in a support arrangement (1, 29), a shift lever (2, 35) pivotably around the pivot axis (8a, 36) with respect to the casing; and wherein the support arrangement (1, 29) supports the shift lever (2, 35) with the casing, pivotably around the tilt axis (9a, 34) aligned transversely of the shift axis (8a, 36), with respect to a housing (3); and wherein the shift lever (2, 35) has a free end upon which the shift finger (2a) is located and is pivotable about the tilt axis (9a, 34) and the pivot axis (8a, 36).

8. Locking device according to claim 7, wherein the tilt axis (9a, 34) and the pivot axis (8a, 36) run mutually spaced apart.

9. Locking device according to claim 7, wherein the locking finger (12) is pivotable about the tilt axis (9a, 34) with the casing (10, 31), is pivotable within the slots (4b) situated one behind another in the pivoting direction of the locking finger (12) and mutually aligned, until the shift finger (2a) positively engages in one of the selected longitudinally movable selector shafts (4, 5, 6, 7) and the locking finger (12) positively engages in the slot of at least one selector shaft (4, 5, 6, 7) to be fixed.

* * * * *